June 21, 1927. 1,633,373

N. B. CREGIER

PHOTOGRAPHIC CAMERA

Filed April 30, 1921

Inventor:
Nathaniel B. Cregier
By Jno. G. Elliott
Atty.

Patented June 21, 1927.

1,633,373

UNITED STATES PATENT OFFICE.

NATHANIEL B. CREGIER, OF CHICAGO, ILLINOIS.

PHOTOGRAPHIC CAMERA.

Application filed April 30, 1921. Serial No. 465,889.

My invention is concerned with photographic cameras, and is designed to produce a clearer definition in the photograph than has been possible heretofore, not only for objects all at the same distance from the object lens, but also for several objects at different distances therefrom.

To this end, I place in any desired form of camera, a plus lens, preferably a meniscus, with its concave face toward the object lens, adjacent the film or plate holder so that the rays, just before they reach the focal plane, pass through and are refracted by said plus lens, and so strike the film, especially toward the edges thereof, perpendicularly, or much more nearly so, than they would have without the employment of this auxiliary lens. I find that as a result, the picture, and more especially the edges thereof, are much more sharply defined than is possible without the employment of my invention.

Figure 1:
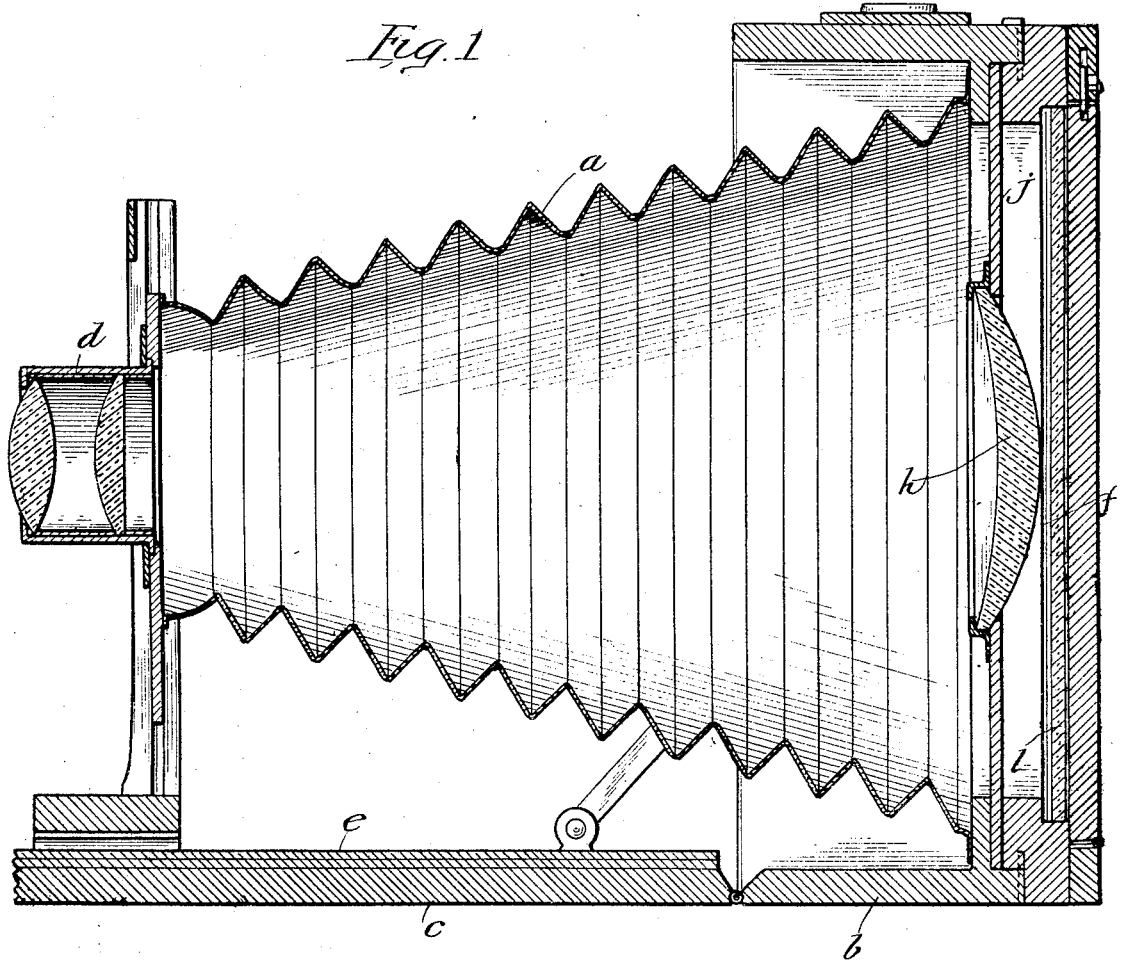
Figure 2:
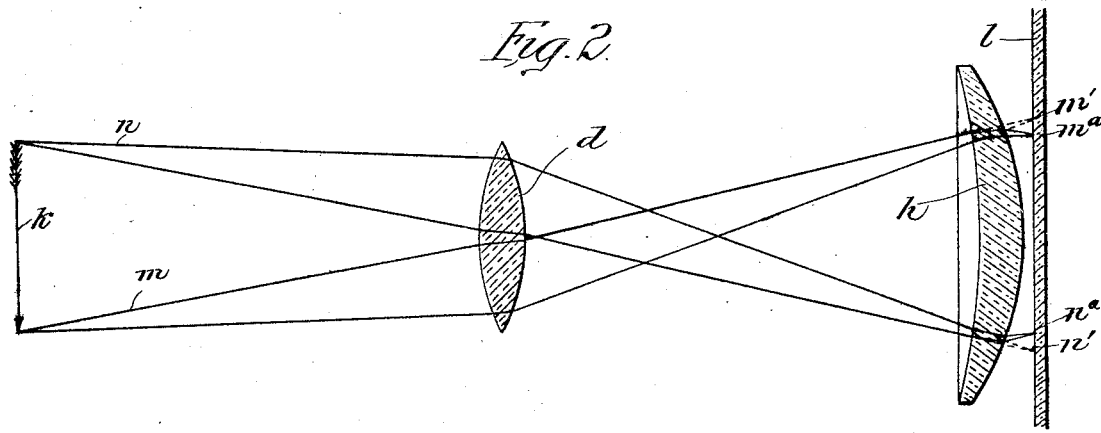

To illustrate my invention, I annex hereto a sheet of drawings in which the same reference characters are used to designate identical parts in all the figures, of which Fig. 1 is a central vertical section showing my invention as applied to the bellows type of camera; and Fig. 2 is a diagrammatic view illustrating the action of the light rays in the camera.

While my invention may be employed with any sort of a camera, I have illustrated it in Fig. 1 as applied to the folding bellows type, in which the bellows $a$ is, when not in use, folded in the casing $b$ with the lid $c$ holding the parts enclosed. The object lens $d$ is carried by the frame secured to the front of the bellows and adjustable on the track $e$ to focus the picture on the sensitized plate which is held at $f$.

The novelty of my invention resides in the employment of the auxiliary lens $h$, which preferably takes the form of a meniscus, with its concave side toward the object glass, and suitably supported as by the frame plate $j$ secured just in front of the plate holder.

The operation of my invention will be best understood from diagrammatic Fig. 2, where the object to be photographed is represented by the arrow $k$ and the sensitized plate $l$ is located just back of the auxiliary lens $h$. The pencil of rays $m$ proceeding from the point of the arrow will be refracted by the object lens at $d$ and without the auxiliary lens $h$ would be focused on the surface of the sensitized plate, as indicated by the dotted lines $m'$. Similarly, the penciled rays $n$ from the feathered end of the arrow would, without the lens $h$, be focused as seen in dotted lines at $n'$ on the film. It will be noticed that these pencils of rays in reaching the sensitized plate, strike it at a considerable angle at the perpendicular. When the auxiliary lens $h$ is interposed, as seen, the pencils of rays are focused at $m^a$ and $n^a$, and it will be noted that when the auxiliary lens is employed, these pencils in striking the film do so substantially at right angles to the surface thereof, even at the outer portions of the picture. It is my conviction that the superior definition secured by employing my invention results from the fact that the rays in reaching the focus, strike the sensitized film more nearly a perpendicular than they would without the employment of the lens. As the emulsion has an appreciable thickness, it will be obvious that if the light rays strike the same substantially perpendicularly, the penetration of the light rays into the sensitized strata will be more clean cut and the resulting picture will, as a result, be more clearly defined.

While I have shown and described my invention as carried out in the manner which I consider best adapted to secure its object, it will be understood that it is capable of modification, and that I do not desire to be limited in the interpretation of the following claim except as may be necessitated by the state of the prior art.

What I claim as new and desire to secure by Letters Patent is:

In a camera, the combination with a box, of an object lens, a holder for a sensitized element, and a meniscus lens with its concave face towards the object lens placed in front of and adjacent the sensitized element, for the purpose described.

In witness whereof, I have hereunto set my hand this 28th day of April, A. D. 1921.

NATHANIEL B. CREGIER.